(12) United States Patent
Yu

(10) Patent No.: US 8,868,074 B2
(45) Date of Patent: Oct. 21, 2014

(54) METHOD, DEVICE AND MOBILE TERMINAL FOR SWITCHING NETWORK CONNECTION AUTOMATICALLY

(75) Inventor: Chentao Yu, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 33 days.

(21) Appl. No.: 13/518,936

(22) PCT Filed: Dec. 15, 2010

(86) PCT No.: PCT/CN2010/079813
§ 371 (c)(1),
(2), (4) Date: Jun. 25, 2012

(87) PCT Pub. No.: WO2011/076073
PCT Pub. Date: Jun. 30, 2011

(65) Prior Publication Data
US 2012/0264444 A1    Oct. 18, 2012

(30) Foreign Application Priority Data
Dec. 25, 2009   (CN) .......................... 2009 1 0243522

(51) Int. Cl.
*H04W 4/00*    (2009.01)

(52) U.S. Cl.
USPC ...................... 455/435.3; 455/435.2; 455/436

(58) Field of Classification Search
USPC ...................... 455/432.1–444, 450
See application file for complete search history.

(56) References Cited

U.S. PATENT DOCUMENTS 4,797,947 A * 1/1989 Labedz .......................... 455/525
5,574,968 A * 11/1996 Olds et al. ..................... 455/428
5,722,072 A * 2/1998 Crichton et al. ............... 455/437
5,794,149 A * 8/1998 Hoo ............................... 455/438
5,926,470 A * 7/1999 Tiedemann, Jr. .............. 370/334
6,442,389 B1 * 8/2002 Marcum ........................ 455/437

(Continued)

FOREIGN PATENT DOCUMENTS

| CN | 1832616 A | 9/2006 |
| CN | 101325769 A | 12/2008 |
| EP | 1876857 | * 1/2008 ............... H04Q 7/38 |

OTHER PUBLICATIONS

International Search Report for PCT/CN2010/079813, dated Mar. 24, 2011, 2 pages.

(Continued)

*Primary Examiner* — Mehmood B Khan
(74) *Attorney, Agent, or Firm* — Brinks Gilson & Lione; G. Peter Nichols

(57) ABSTRACT

A method, a device and a mobile terminal for switching network connection automatically are provided by the embodiments of the present invention. The method includes: using one of the multiple available network connections for the mobile terminal as the current network connection, and setting the other network connections of the multiple network connections as the standby network connections; switching the mobile terminal to one of the standby network connections according to the priority order of the standby network connections when preset switching event which happens at present time is detected. Application of the method, device and mobile terminal provided by the embodiments of the present invention can provide automatic and quick switching to the standby network connections, thereby improving the switching efficiency without affecting the uninterrupted usage of the network for the user.

13 Claims, 4 Drawing Sheets

(56) References Cited

U.S. PATENT DOCUMENTS

| | | | |
|---|---|---|---|
| 6,671,514 B1* | 12/2003 | Cedervall et al. | 455/456.1 |
| 7,620,065 B2* | 11/2009 | Falardeau | 370/465 |
| 8,355,371 B2* | 1/2013 | Nogami et al. | 370/329 |
| 2002/0049039 A1* | 4/2002 | Natarajan | 455/62 |
| 2004/0023634 A1* | 2/2004 | Jeong et al. | 455/403 |
| 2006/0234705 A1* | 10/2006 | Oommen | 455/435.3 |
| 2007/0105589 A1* | 5/2007 | Lu | 455/556.2 |
| 2007/0232311 A1* | 10/2007 | Kuhn et al. | 455/436 |
| 2007/0275717 A1* | 11/2007 | Edge et al. | 455/434 |
| 2008/0045220 A1* | 2/2008 | Ishii et al. | 455/438 |
| 2008/0182615 A1* | 7/2008 | Xue et al. | 455/552.1 |
| 2008/0198811 A1* | 8/2008 | Deshpande et al. | 370/332 |
| 2009/0080384 A1* | 3/2009 | Leung | 370/336 |
| 2009/0264130 A1* | 10/2009 | Catovic et al. | 455/436 |
| 2010/0003986 A1* | 1/2010 | Chen | 455/436 |
| 2010/0075667 A1* | 3/2010 | Nakamata et al. | 455/432.3 |
| 2010/0093349 A1* | 4/2010 | Gandhi et al. | 455/435.2 |
| 2010/0262682 A1* | 10/2010 | Dunn et al. | 709/221 |
| 2011/0202680 A1* | 8/2011 | Bells et al. | 709/238 |

OTHER PUBLICATIONS

PCT/CN2010/079813 International Preliminary Report on Patentability dated Jun. 26, 2012 (7 pages).

* cited by examiner

METHOD, DEVICE AND MOBILE TERMINAL FOR SWITCHING NETWORK CONNECTION AUTOMATICALLY

FIELD OF THE INVENTION

The present invention relates to mobile communication field, and particularly to a method, an apparatus and a mobile terminal for automatically switching network connection.

BACKGROUND

Recently, in the current mobile terminals (for example, a notebook computer or a mobile phone), generally a plurality of networks are available for connection. At the same time, with the spread of netbooks and advanced mobile terminals, the mobile terminal may also be provided with connections including wire network, wireless network, such as WiFi, the $2^{nd}$ Generation mobile communication technology and/or the $3^{rd}$ Generation, and the like. One mobile terminal may generally only use one network as its default connection, but this network connection may not be always available. In practical applications, a user often accesses a WiFi network and establishes a connection, but the user has to accomplish a further security authentication before using the network connection normally, although the WiFi network may operate at this time (for example, in a WiFi hot spot at airport and hotel). Sometimes, the network transmission of the mobile terminal may often interrupt although the mobile terminal has connected to the WiFi network, because too many mobile terminals connect at the same time.

The current Universal Access Method (UAM) generally utilizes a roaming mechanism allowed by wireless operators. That is, a roaming user may access the network by inputting his/her username and password through a login interface, when he/she accesses a homepage using a web browser. However, the UAM needs not only lots of local devices to settle the switch problem among various network connections, for example, a roaming problem between 3G and WiFi, which demands a support from all of the mobile terminals, but also a close cooperation among the operators in the various network connections, which would bring a high cost for switching among the network connections and take a long period for switching among the network connections, thus the switch efficiency is low.

SUMMARY

The embodiments of the present invention provide a method, an apparatus and a mobile terminal for automatically switching network connection, in order to settle a problem of low switching efficiency caused by a long period taken for switching among the network connections in a mobile terminal of the prior art.

According to an embodiment of the present invention, a method for automatically switching network connections is provided, which is applied to a mobile terminal, the method comprises:

utilizing one of a plurality of network connections which are available for the mobile terminal as the current network connection, and setting the remaining network connections among the plurality of network connections as candidate network connections;

switching the mobile terminal to one of the candidate network connections in a priority order among the candidate network connections, when it is detected that a preset switch event occurs currently.

Optionally, the preset switch event comprises that the current network of the mobile terminal has been disconnected for a period of time or a network quality of the current network connection is continuously below a threshold.

Optionally, the step of switching the mobile terminal to one of the candidate network connections in the priority order among the candidate network connections comprises:

switching to the candidate network connection directly, when only one candidate network connection exists; and switching the current network connection to a candidate network connection having the highest priority, when a plurality of candidate network connections exist.

Optionally, when the plurality of network connections comprise a wire connection and a wireless Local Area Network connection, the priority order is that the wire connection is prior to the WLAN connection;

when the plurality of network connections comprises a wire connection and a Wide Area Network connection, the priority order is that the wire connection is prior to the WAN connection;

when the plurality of network connections comprises the WLAN connection and the WAN connection, the priority order is that the WLAN connection is prior to the WAN connection; and when the plurality of network connections comprises the WAN connection and the WAN connection includes UMTS/CDMA2000, GPRS/CDMA, GSM, the priority order is that UMTS/CDMA2000 is prior to GPRS/CDMA, and GPRS/CDMA is prior to GSM.

Optionally, the priority order is decided according to default network connection speed of the network connection.

Optionally, the step of utilizing one of a plurality of network connections which are available for the mobile terminal as the current network connection comprises:

utilizing one network connection having the highest priority among the plurality of available network connections as the current network connection.

Optionally, the method further comprises:

automatically performing a network connection availability detection regularly, and setting the network connection passing the availability detection as the network connection which is available for the mobile terminal.

Optionally, the network connection availability detection comprises: the mobile terminal performing a connection operation on a list of specified network sites and detecting returning result, in a case where the network connection operates normally.

Optionally, the method further comprises:

if a network connection of the candidate network connections fails to pass the network connection availability detection, the network connection failing to pass the availability detection is deleted from the candidate network connections.

According to another embodiment of the present invention, an apparatus for automatically switching network connections is provided, the apparatus comprises:

a setting module for utilizing one of a plurality of network connections which are available for the mobile terminal as the current network connection, and setting the remaining network connections among the plurality of network connections as candidate network connections.

a switch module for switching the mobile terminal to one of the candidate network connections in a priority order among the candidate network connections, when it is detected that a preset switch event occurs currently.

Optionally, the switch module comprises:

a first switch sub-module for switching to the candidate network connection directly, when only one candidate network connection exists; and a second switch sub-module for switching the current network connection to a candidate network connection having the highest priority, when a plurality of candidate network connections exist.

Optionally, the apparatus further comprises:

a detection module for automatically performing a plurality of network connection availability detections regularly, and setting the network connection passing the availability detection as the network connection which is available for the mobile terminal.

Optionally, the detection module performs a connection operation on a list of specified network sites and detects returning result, in a case where the network connection operates normally.

According to another embodiment of the present invention, a mobile terminal is provided and comprises:

a setting module for utilizing one of a plurality of network connections which are available for the mobile terminal as the current network connection, and setting the remaining network connections among the plurality of network connections as candidate network connections;

a switch module for switching the mobile terminal to one of the candidate network connections in a priority order among the candidate network connections, when it is detected that a preset switch event occurs currently; and a network connection module for connecting the mobile terminal to a corresponding network through the current network connection when it is not detected that the preset switch event occurs currently, and for connecting the mobile terminal to a corresponding network connection through the candidate network connection switched by the switch module thereto.

The present invention has the following advantageous effects, as compared with the prior art:

the mobile terminal is enable to switch to a candidate network connection rapidly and automatically when a preset switch event occurs by presetting a plurality of other available network connections than the current network connection for the mobile terminal, so that the switch efficiency may be increased without affecting continuous usage of network connection for the user.

BRIEF DESCRIPTION OF THE DRAWINGS

In order to clearly explain the technical solutions of the present invention or prior art, drawings used during describing embodiments or prior art are introduced briefly below, and obviously the drawings in the following description are only some embodiments of the present invention. It is apparent for those of ordinary skill in the art that other drawings may further be derived from these drawings without contributing any inventive labors.

DETAILED DESCRIPTION

Below detailed technical solutions in the embodiments of the present invention will be described clearly and completely in connection with the accompanying drawings, and obviously the described embodiments are only a part of embodiments of the present invention but not the whole. Based on the embodiments of the present invention, other embodiments made by those of ordinary skill in the art without any inventive labors will fall into the scope sought for protection by the present invention.

In order to make objects, solutions and advantages of the present invention clearer, below implementations of the present invention will be described in further details.

Figure 1:
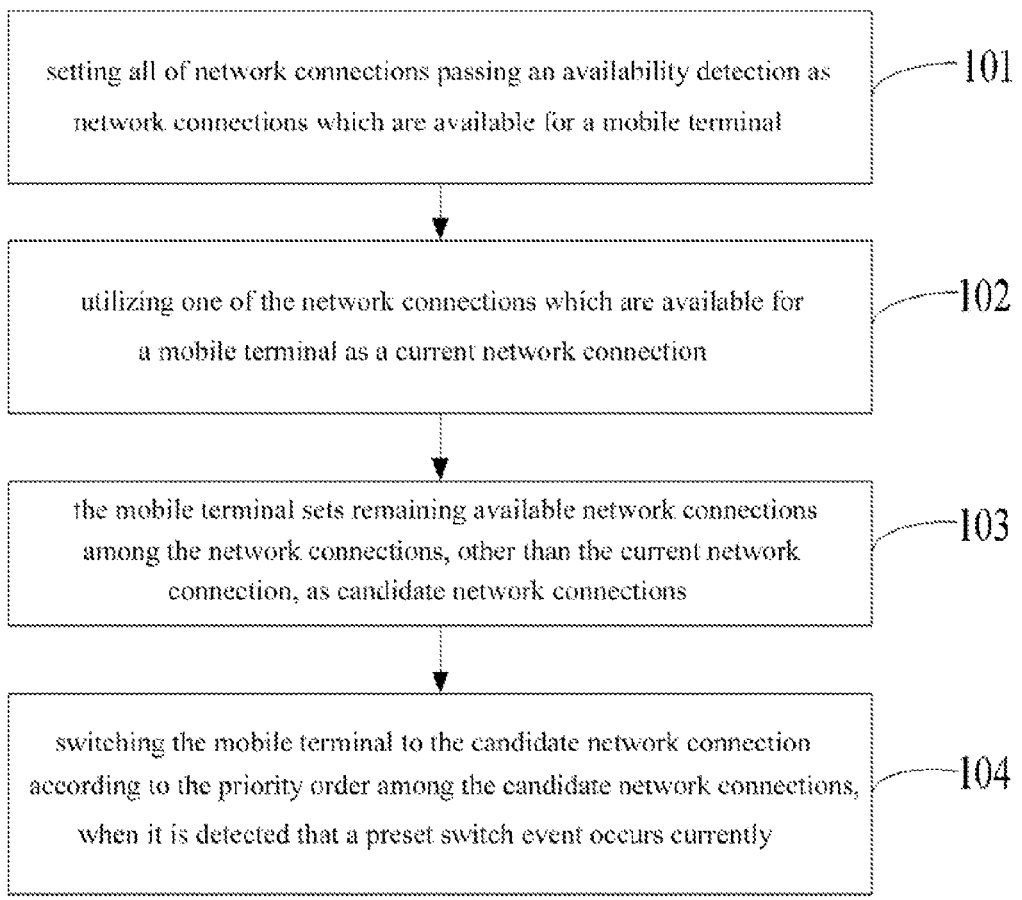
FIG. 1 is a flowchart of a method embodiment 1 for automatically switching network connections according to an embodiment of the present invention.

Referring to FIG. 1, in the method embodiment 1 for automatically switching network connection according to an embodiment of the present invention, the method may comprise steps as follows.

Step 101: setting all of network connections passing an availability detection as a plurality of network connections which are available for a mobile terminal.

The mobile terminal performs the availability detection on networks to which network basic parameters has been configured, and considers a network connection as an available network connection when the network connection can pass the availability detection.

In a case that the mobile terminal connects to an external power supply, the mobile terminal may detect the availability of the network connections regularly in a short interval and automatically in background, and record the current network scene as it fails.

In a case that the mobile terminal does not connect to the external power supply, the mobile terminal may detect the availability of the network connections regularly in a long interval and automatically in background, record the current network scene as it fails, and would not perform the availability detection on the network connection if its current network scene does not change. The short interval and the long interval may be set by a user himself/herself, and the present invention is not limited to a specified value.

The current network scene refers to: a IP address for a wire connection (LAN), and the detection may not be performed if the IP address does not exist; a operating channel radio intensity of the current wireless connection for wireless Local Area Network connection and a Wide Area Network connection (WiFi), and the detection may not be performed if the operating channel radio intensity is below a predetermined threshold continuously.

The availability detection refers to an operation for attempting to connect with a specific list of websites and detecting return results, in a case that a network connection is set, all of under-layer operation parameters of the network are configured and the network operates normally. The list of websites is a set of preset common-used websites (such as www.sina.com.cn; www.baidu.com; www.google.com; www.yahoo.com; etc.). The mobile terminal may determine whether the website is connectable by using a standard Ping protocol, or transmitting a webpage acquiring request in a HTTP protocol and checking a return value according to the request result (the HTTP protocol returns a return value of 200 OK). The mobile terminal may set any one of the websites in the list of websites as the available network connection if this website returns a proper value.

Step 102: utilizing one of the plurality of network connections which are available for a mobile terminal as the current network connection.

In the present embodiment, the mobile terminal may be a terminal which can access a plurality of network connections, such as a notebook computer, mobile phone, and the like, and the mobile terminal can only use one network connection to acquire network data when it needs to connect with a network. The current network connection refers to a current operation network to which the mobile terminal connects and acquires data therefrom. For the mobile terminal of the present embodiment, the number of the available network connections is more than one, that is, all of the plurality of network connections passing the availability detection for the network connection are referred to as the plurality of network connections which are available for a mobile terminal, and the mobile terminal may utilize one of the available network connections as the current network connection in advance. The mobile terminal may set the current network connection among the available network connections in advance, according to the user's setting or a default network connection priority order.

Step 103: the mobile terminal sets remaining available network connections among the plurality of network connections, other than the current network connection, as candidate network connections.

Because the number of network connections which are available for the mobile terminal is more than one, remaining available network connections other than the current network connection may be set as the candidate network connections, which might be candidate networks for the mobile terminal if the current network connection is unavailable. The mobile terminal may manage the candidate network connections by creating a list of candidate network connections and updating the same. The number of the candidate network connections may be one or more. The mobile terminal may update the list of the candidate network connections in real time according to the result of the availability detection.

Step 104: switching the mobile terminal to the candidate network connection according to the priority order among the candidate network connections, when it is detected that a preset switch event occurs currently.

Switching the mobile terminal to the only one candidate network connection directly, when only one candidate network connection exists; and switching the mobile terminal according to the priority order, when a plurality of candidate network connections exist, for example, switching the mobile terminal to a candidate network connection having the highest priority.

In the present embodiment, the preset switch event may comprise: the current network connection of the mobile terminal has been disconnected for a certain period of time; or the network quality of the current network connection is continuously below a predetermined threshold for a certain period of time. The period of time may be adjusted adaptively depending on actual network environment, and the present invention is not limited to any detailed value for the period of time. Of course, the preset switch event also may be other switch conditions set by the user freely. In the operation process of the mobile terminal, a background system may automatically switch the network connection of the mobile terminal according to the priority order among the candidate network connections if the current network connection disconnects. In terms of the user accessing a network by the mobile terminal, the switching of the network connection could be performed rapidly and his/her usage would not be influenced as long as the candidate network connection exists, because the system may automatically reselect the candidate network connection from the list of the candidate network connections according to the priority order, when it is detected that the preset switch event occurs currently. If the mobile terminal is browsing web pages using a browser, a webpage refresh request may be initiated from an under-layer when the system performs the switching of network connection, so as to ensure that the webpage browsing of the user is not influenced.

It is note that all of the network connections passing the availability detection are set as the plurality of network connections which are available for a mobile terminal and the plurality of network connections are set, respectively, in the above-described embodiment. However, the Step 101 in the above-described embodiment is not necessary. The method according to the present embodiment can perform setting according to the current available network connections. That is to say, in the method according to the present embodiment, utilizing one of a plurality of network connections which are available for the mobile terminal as the current network connection, and setting the remaining network connections among the plurality of network connections as candidate network connections; switching the mobile terminal to one of the candidate network connections in the priority order among the candidate network connections, when it is detected that the preset switch event occurs currently.

Therefore, with the method according to the embodiment of the present invention, the mobile terminal is enable to switch to a candidate network connection rapidly and automatically when a preset switch event occurs by presetting plurality of other available network connections than the current network connection for the mobile terminal, without a close cooperation among the operators in the various network connections. Thus, a switching cost among the network connections is saved and a switching time of the network connections is reduced, so that the switch efficiency may be increased without affecting continuous usage of network connection for the user.

Figure 2:
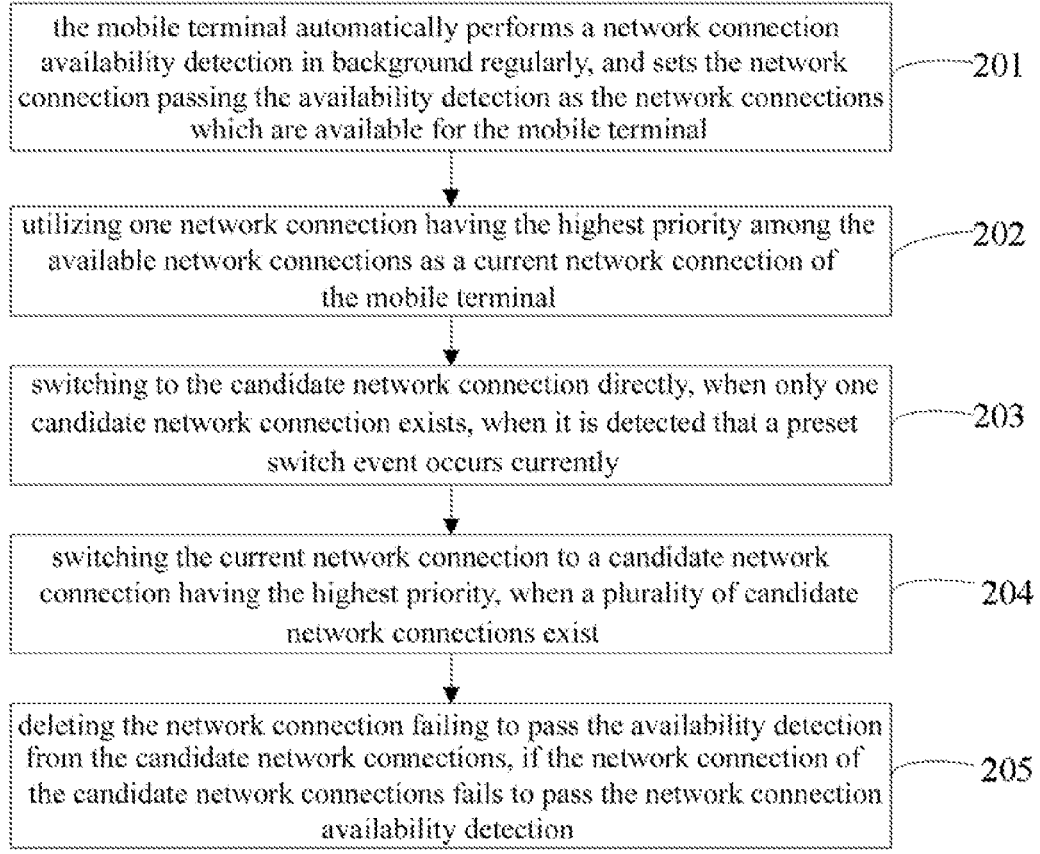
FIG. 2 is a flowchart of a method embodiment 2 for automatically switching network connections according to an embodiment of the present invention.

Referring to FIG. 2, in the method embodiment 2 for automatically switching network connections according to an embodiment of the present invention, the method may comprise detailed steps as follows.

Step 201: automatically performing a network connection availability detection regularly, and setting the network connection passing the availability detection as the network connection which is available for the mobile terminal.

In the present embodiment, the mobile terminal performs an availability detection on the plurality of network connections at first in background. An implementation of the availability detection may be as follows: setting a network connection; attempting to connect with a specific list of websites and detecting return results, in a case that all of under layer operation parameters of the network are configured and the network operates normally. The list of websites is a set of preset common-used websites (such as www.sina.com.cn; www.baidu.com; www.google.com; www.yahoo.com; etc.). The mobile terminal may determine whether the website is connectable by using a standard Ping protocol, or transmitting a webpage acquiring request in a HTTP protocol and checking a return value according to the request result (the HTTP protocol returns a return value of 200 OK). The mobile terminal may set any one of the websites in the list of websites as the available network connection if this website returns a proper value.

The plurality of network connections may comprise a wire connection, a wireless Local Area Network connection and/or a Wide Area Network connection. In a case that the mobile terminal connects to an external power supply, the mobile terminal may detect the availability of the network connections regularly in a short interval and automatically in background, and record the current network scene as it fails. In a case that the mobile terminal does not connect to the external power supply, the mobile terminal may detect the availability of the network connections regularly in a long interval and automatically in background, record the current network scene as it fails, and would not perform the availability detection on the network connection if its current network scene does not change. The current network scene may refer to: a IP address for a wire connection (LAN), and the detection may not be performed if the IP address does not exist; a operating channel radio intensity of the current wireless connection for wireless Local Area Network connection and a Wide Area Network connection (WiFi), and the detection may not be performed if the operating channel radio intensity is below a predetermined threshold continuously.

It should be explained that both the short interval and the long interval used by the mobile terminal are relative values, and may be set by a user freely depending on actual network environment and current batter capacity in practice. Also, for other thresholds used in the present embodiment, which should be predetermined, they may be updated depending on actual conditions, and the present invention is not limited to a specified value. Furthermore, it is needed to configure the under layer network parameters when the availability of network connection is detected. For the wire connection (LAN), the parameters comprise IP addresses, gateway, address of DNS server, network mask, and the like; for the wireless Local Area Network connection (WiFi), the parameters comprise a radio operation channel, an accessed identifier (SSID), a wireless encryption manner and its key, an IP address, a gateway, an address of DNS server, a network mask, and the like; and for the Wide Area Network connection (for example, GSM, GPRS, CDMA, UMTS and/or CDMA2000), the parameters comprise a radio operation channel, an access points (APN), a user name and a password, a wireless data connection manner, an IP addresses, a gateway, and the like. If the under layer network parameters could not be set properly, no availability detection is performed and this network connection is considered as unavailable.

Step 202: utilizing one network connection having the highest priority among the plurality of available network connections as the current network connection of the mobile terminal.

In the present embodiment, for the wire connection, the wireless Local Area Network connection and the Wide Area Network connection, the priority order may be that: the wire connection is prior to the Wireless Local Area Network connection; the Wireless Local Area Network connection is prior to the Wide Area Network connection; and in the Wide Area Network connection, a UMTS/CDMA2000 is prior to the GPRS/CDMA, and the GPRS/CDMA is prior to the GSM. The above priority order is decided according to default connection speed of a plurality of network bandwidths. Of course, the priority order may also be adjusted according to other factors, such as network fee that the user needs to pay. In this step, the one having the highest priority among the plurality of available network connections is selected as the current network connection for the mobile terminal.

Step 203: switching to the candidate network connection directly, when only one candidate network connection exists, when it is detected that a preset switch event occurs currently.

The mobile terminal will perform the switching of the network connection when the mobile terminal detects that the current network connection disconnects or the network speed of the current network connection below a predetermined threshold. If there is only one candidate network connection, switching to the candidate network connection directly.

Step 204: switching the current network connection to a candidate network connection having the highest priority, when a plurality of candidate network connections exist.

If there are a plurality of candidate network connections, the current network connection of the mobile terminal may be switched to the candidate network connection having the highest priority directly. It should be noted that if the candidate network connection having the highest priority also disconnects or its network quality is not good enough thereafter, the mobile terminal may switch the current network connection to a candidate network connection having a second highest priority directly. In practice, the plurality of candidate network connections may be switched sequentially according to the priority order.

In the network connections as described in the embodiment of the present invention, the priority order may be expressed in a table below.

TABLE 1

| | priority order |
|---|---|
| Only one candidate network connection | None, and setting directly |
| Candidate network connections comprising Wide Area Network connection and wireless Local Area Network connection | 1. A network connection established lately is the default network connection having the highest priority<br>2. If the wireless Local Area Network connection exists and is normal, the wireless Local Area Network connection is set as the candidate network connection having the highest priority<br>3. if the wireless Local Area Network connection disconnects, the Wide Area Network connection is set as the candidate network connection having the highest priority automatically |
| Candidate network connections comprising wireless Local Area Network connection and wire connection | 1. If the wire connection exists and is normal, the wire connection is set as the candidate network connection having the highest priority<br>2. if the wire connection disconnects, the |

TABLE 1-continued

| | priority order |
|---|---|
| | wireless Local Area Network connection is set as the candidate network connection having the highest priority automatically |
| Candidate network connections comprising Wide Area Network connection and wire connection | 1. If the wire connection exists and is normal, the wire connection is set as the candidate network connection having the highest priority<br>2. if the wire connection disconnects, the Wide Area Network connection is set as the candidate network connection having the highest priority automatically |
| Candidate network connections comprising Wide Area Network connection, wireless Local Area Network connection and wire connection | 1. If the wire connection exists and is normal, the wire connection is set as the candidate network connection having the highest priority<br>2. if the wire connection disconnects, the Wide Area Network connection and the wireless Local Area Network connection are connected to according to their priority orders |

It should note that the plurality of priority orders in Table 1 are only some exemplary example, and other priority orders which are not disclosed in this embodiment of the present invention also belong to the scope sought for protection by the present invention.

Step 205: deleting the network connection failing to pass the availability detection from the candidate network connections, if the network connection of the candidate network connections fails to pass the network connection availability detection.

When the candidate network connections are managed by the list of candidate network connections, one or more candidate network connections failing to pass the availability detection may be deleted directly from the list of the candidate network connections, if the one or more candidate network connections in the list of the candidate network connections are unavailable during a periodic detection performed by the mobile terminal thereafter. It should note that the Step 205 is a process for maintaining the candidate network connections and can be performed continuously during the running of background program, therefore this Step 205 may be performed separately from the previously described steps or concurrently with any one of the previously described steps. That is, the Step 205 may be performed at any suitable time. In this embodiment, the Step 205 is described as following the Step 204 only for convenient description, but those skilled in the art should understand that the performing order of the Step 205 is not limited thereto. Furthermore, the Step 205 may also be implemented in a way that the candidate network connection is deleted from the list of the candidate network connections only if the network connection is inaccessible as switching.

In a case that the mobile terminal connects to an external power supply, the mobile terminal may detect the availability of the network connections regularly in a short interval and automatically in background, and record the current network scene as it fails.

In a case that the mobile terminal does not connect to the external power supply, the mobile terminal may detect the availability of the network connections regularly in a long interval and automatically in background, record the current network scene as it fails, and would not perform the availability detection on the network connection if its current network scene does not change.

In this embodiment, the candidate network connections may be managed by the list of candidate network connections, and the current network connection being used by the mobile terminal could be switched sequentially according to the preset priority order, so that the switching among the network connections may be accomplished while the user is unaware of it. With the method for automatically switching the network connections according to the priority order among the candidate network connections in the embodiment of the present invention, the quality and performance of the current network connection in the mobile terminal are ensured, while the usage experiences of the network connection by the user is enhanced.

Figure 3:
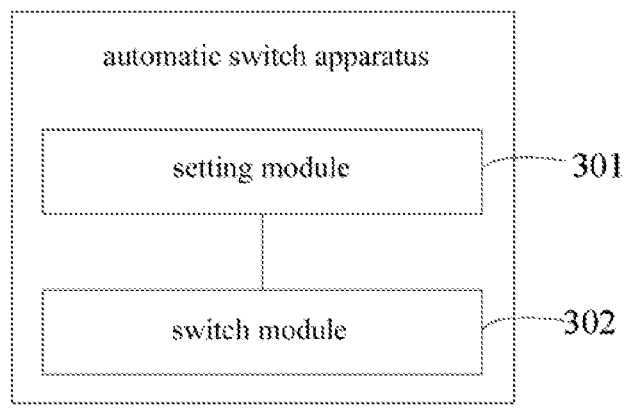
FIG. 3 is a schematic view illustrating a structure of an apparatus embodiment 1 for automatically switching network connections according to an embodiment of the present invention.

Referring to FIG. 3, in an apparatus embodiment 1 for automatically switching network connections according to an embodiment of the present invention, the apparatus may comprise modules as follows.

A setting module 301, which is used for utilizing one of a plurality of network connections which are available for the mobile terminal as the current network connection, and setting the remaining network connections among the plurality of network connections as candidate network connections.

The mobile terminal performs the availability detection on networks to which network basic parameters has been configured, and considers a network connection as an available network connection when the network connection can pass the availability detection. In a case that the mobile terminal connects to an external power supply, the mobile terminal may detect the availability of the network connections regularly in a short interval and automatically in background, and record the current network scene as it fails. In a case that the mobile terminal does not connect to the external power supply, the mobile terminal may detect the availability of the network connections regularly in a long interval and automatically in background, record the current network scene as it fails, and would not perform the availability detection on the network connection if its current network scene does not change.

The apparatus according to the embodiment of the present invention may be integrated on the mobile terminal as an individual functional entity in the mobile terminal. In the present embodiment, the mobile terminal may be a terminal which can access a plurality of network connections, such as a notebook computer, mobile phone, and the like, and the mobile terminal can only use one network connection to acquire network data when it needs to connect with a network. The current network connection refers to a current operation network to which the mobile terminal connects and acquires data therefrom. For the mobile terminal of the present embodiment, the number of the available network connections is more than one, and the mobile terminal may utilize one of the available network connections as the current network connection in advance. The number of the candidate network connections may be one or more. The mobile terminal may update the list of the candidate network connections in real time according to the result of the availability detection.

A switch module 302, which is used for switching the mobile terminal to one of the candidate network connections in a priority order among the candidate network connections, when it is detected that a preset switch event occurs currently.

Because the number of network connections which are available for the mobile terminal is more than one, remaining available network connections other than the current network connection may be set as the candidate network connections, which might be candidate networks for the mobile terminal if the current network connection is unavailable. The mobile terminal may manage the candidate network connections by creating a list of candidate network connections and updating the same.

Therefore, with the apparatus according to the embodiment of the present invention, the mobile terminal is enable to switch to a candidate network connection rapidly and automatically when a preset switch event occurs by presetting plurality of other available network connections than the current network connection for the mobile terminal, without close cooperation among the operators in the various network connections. Thus, a switching cost among the network connections is saved and a switching time of the network connections is reduced, so that the switch efficiency may be increased without affecting continuous usage of network connection for the user.

Figure 4:
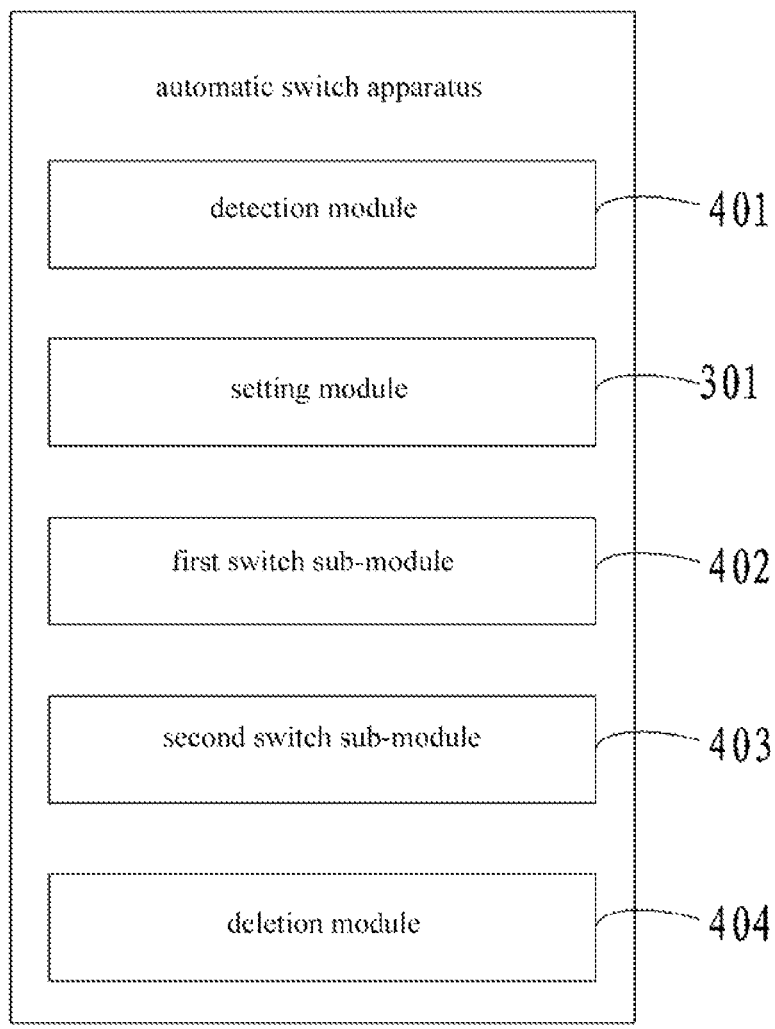
FIG. 4 is a schematic view illustrating a structure of an apparatus embodiment 2 for automatically switching network connections according to an embodiment of the present invention.

Referring to FIG. 4, in an apparatus embodiment 2 for automatically switching network connections according to an embodiment of the present invention, the apparatus may comprise modules as follows.

A detection module 401, which is used for automatically performing a plurality of network connection availability detections regularly, and setting the network connection passing the availability detection as the network connection which is available for the mobile terminal.

The plurality of network connections may comprise a wire connection, a wireless Local Area Network connection and/or a Wide Area Network connection. In a case that the mobile terminal connects to an external power supply, the mobile terminal may detect the availability of the network connections regularly in a short interval and automatically in background, and record the current network scene as it fails. In a case that the mobile terminal does not connect to the external power supply, the mobile terminal may detect the availability of the network connections regularly in a long interval and automatically in background, record the current network scene as it fails, and would not perform the availability detection on the network connection if its current network scene does not change.

A setting module 301, which is used for utilizing one of a plurality of network connections which are available for the mobile terminal as the current network connection, and setting the remaining network connections among the plurality of network connections as candidate network connections.

A first switch sub-module 402, which is used for switching to the candidate network connection directly, when only one candidate network connection exists.

A second switch sub-module 403, which is used for switching the current network connection to a candidate network connection having the highest priority, when a plurality of candidate network connections exist.

Optionally, the apparatus according to this embodiment may further comprise:

A deletion module 404, which is used for deleting the network connection failing to pass the availability detection from the candidate network connections, if the network connection of the candidate network connections fails to pass the network connection availability detection.

When the candidate network connections are managed by the list of candidate network connections, one or more candidate network connections failing to pass the availability detection may be deleted directly from the list of the candidate network connections, if the one or more candidate network connections in the list of the candidate network connections are unavailable during a periodic detection performed by the mobile terminal thereafter. It should note that the deletion module 404 is used in a process for maintaining the candidate network connections and can be performed continuously during the running of background program, therefore this deletion module 404 may be performed separately from the previously described modules or concurrently with any one of the previously described modules. In this embodiment, the deletion module 404 is described in association with the second switch sub-module 403 only for convenient description, but those skilled in the art should understand that the connection relationship among the modules is not limited thereto. Furthermore, the deletion module 404 may delete the candidate network connection from the list of the candidate network connections only if the network connection is inaccessible as switching.

In this embodiment, the candidate network connections may be managed by the list of candidate network connections, and the current network connection being used by the mobile terminal could be switched sequentially according to the preset priority order, so that the switching among the network connections may be accomplished while the user is unaware of it. With the method for automatically switching the network connection according to the priority orders of the candidate network connections in the embodiment of the present invention, the quality and performance of the current network connection in the mobile terminal are ensured, while the usage experiences of the network connection by the user is enhanced.

Figure 5:
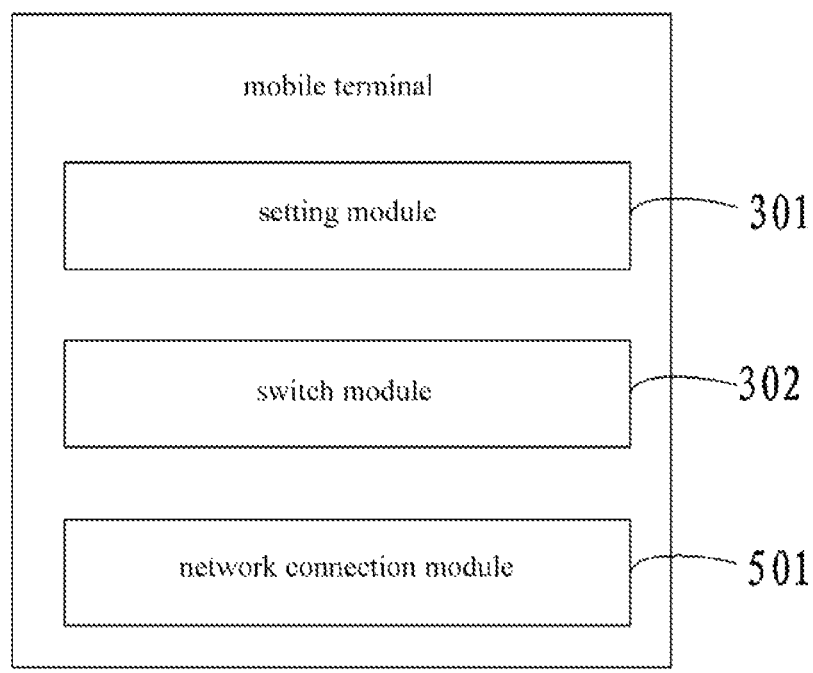
FIG. 5 is a schematic view illustrating a structure of a mobile terminal embodiment for automatically switching network connections according to an embodiment of the present invention.

Referring to FIG. 5, in a mobile terminal embodiment for automatically switching network connections according to an embodiment of the present invention, the mobile terminal may comprise modules as follows:

a setting module 301, which is used for utilizing one of a plurality of network connections which are available for the mobile terminal as the current network connection, and setting the remaining network connections among the plurality of network connections as candidate network connections;

a switch module 302, which is used for switching the mobile terminal to one of the candidate network connections in a priority order among the candidate network connections, when it is detected that a preset switch event occurs currently; and a network connection module 501, which is used for connecting the mobile terminal to a corresponding network through the current network connection when it is not detected that the preset switch event occurs currently, and for connecting the mobile terminal to a corresponding network connection through the candidate network connection switched by the switch module thereto.

The network connection module is adapted to connect with a corresponding network through the current network connection utilized by the setting module, or through the candidate network connection switched by the switch module thereto. The mobile terminal may be a terminal which can access a plurality of network connections, such as a notebook computer, mobile phone, and the like. With the mobile terminal according to the embodiment of the present invention, the mobile terminal is enable to switch to a candidate network connection rapidly and automatically when a preset switch event occurs by presetting plurality of other available network connections than the current network connection for the mobile terminal, without a close cooperation among the operators in the various network connections. Thus, a switching cost among the network connections is saved and a switching time of the network connections is reduced, so that the switch efficiency may be increased without affecting continuous usage of network connection for the user.

The descriptions for the apparatus and mobile terminal embodiments in the present invention are simple because they are similar to the corresponding method embodiments, and their detailed implementations may refer to the above-described method embodiments.

It will be understood that, although the terms first, second, third etc. may be used herein to describe various entities and/or operations, these entities and/or operations should not be limited by these terms. These terms are only used to distinguish one entity or operation from another entity or operation, instead of requiring or implying any substantive relationship or sequence among these entities and/or operations. Further, the terms "comprises" and/or "comprising," or "includes" and/or "including", when used in this specification, intend to specify the nonexclusive presence of stated processes, methods, objects, or devices including a series of elements, thus these processes, methods, objects, or devices also may other elements which are not listed explicitly or inherent elements belonging to the processes, methods, objects, or devices. Unless otherwise defined, the element defined by an expression of "includes one" does not preclude the presence of other same element in the processes, methods, objects, or devices including the element.

Those of ordinary skill in the art can understand that all or a part of the steps in the method according to above-described embodiments may be implemented in related hardware by receiving instructions from programs which may be stored in a computer readable storage medium and comprise instructions for performing the methods according to the embodiments of the present invention as execution. The storage medium may, for example, a ROM/RAM, a magnetic disk, an optical disk, and the like.

The above are only exemplary embodiments of the disclosed solution, but the scope sought for protection is not limited thereto. Instead, any or all modifications or replacements as would be obvious to those skilled in the art are intended to be included within the scope of the present invention. Therefore, the scope of the present invention is defined in the appended claims.

What is claimed is:

1. A method for automatically switching network connections, which is applied to a mobile terminal, the method comprising:
   utilizing one of a plurality of network connections which are available for the mobile terminal as a current network connection, and setting remaining network connections among the plurality of network connections as candidate network connections; and
   switching the mobile terminal to one of the candidate network connections in a priority order among the candidate network connections, when it is detected that a preset switch event occurs currently;
   wherein, when the plurality of network connections comprises a wire connection and a wireless Local Area Network (WLAN) connection, the priority order is that the wire connection is prior to the WLAN connection;
   when the plurality of network connections comprises the wire connection and a Wide Area Network (WAN) connection, the priority order is that the wire connection is prior to the WAN connection;
   when the plurality of network connections comprises the WLAN connection and the WAN connection, the priority order is that the WLAN connection is prior to the WAN connection; and
   when the plurality of network connections comprises the WAN connection and the WAN connection includes a UMTS/CDMA2000, a GPRS/CDMA, a GSM, the priority order is that the UMTS/CDMA2000 is prior to the GPRS/CDMA, and the GPRS/CDMA is prior to the GSM.

2. The method as claimed in claim 1, wherein the preset switch event comprises that the current network of the mobile terminal has been disconnected for a period of time or a network quality of the current network connection is continuously below a threshold.

3. The method as claimed in claim 1, wherein the step of switching the mobile terminal to one of the candidate network connections in a priority order among the candidate network connections comprises:
   switching to the candidate network connection directly, when only one candidate network connection exists; and
   switching the current network connection to a candidate network connection having the highest priority, when a plurality of candidate network connections exist.

4. The method as claimed in claim 1, wherein the priority order is decided according to default network connection speed of the network connection.

5. The method as claimed in claim 1, wherein the step of utilizing one of a plurality of network connections which are available for the mobile terminal as the current network connection comprises: utilizing one network connection having the highest priority among the plurality of available network connections as the current network connection.

6. The method as claimed in claim 1, further comprising: automatically performing a network connection availability detection regularly, and setting the network connection passing the availability detection as the network connection which is available for the mobile terminal.

7. The method as claimed in claim 6, wherein the network connection availability detection comprises that the mobile terminal performs a connection operation on a list of specified network sites and detects returning result, in a case where the network connection operates normally.

8. The method as claimed in claim 6, further comprising:
   if a network connection of the candidate network connections fails to pass the network connection availability detection, the network connection failing to pass the availability detection is deleted from the candidate network connections.

9. An apparatus for automatically switching network connections, comprising:
   a setting module for utilizing one of a plurality of network connections which are available for a mobile terminal as a current network connection, and setting remaining network connections among the plurality of network connections as candidate network connections;
   a switch module for switching the mobile terminal to one of the candidate network connections in a priority order among the candidate network connections, when it is detected that a preset switch event occurs currently; and a network connection module configured for connecting the mobile terminal to a corresponding network through the current network connection used by the setting module and for connecting the mobile terminal to a corresponding network connection through the one of the candidate network connections switched by the switch module thereto;

wherein, when the plurality of network connections comprises a wire connection and a wireless Local Area Network connection (WLAN), the priority order is that the wire connection is prior to the WLAN connection;

when the plurality of network connections comprises the wire connection and a Wide Area Network (WAN) connection, the priority order is that the wire connection is prior to the WAN connection;

when the plurality of network connections comprises the WLAN connection and the WAN connection, the priority order is that the WLAN connection is prior to the WAN connection; and when the plurality of network connections comprises the WAN connection and the WAN connection includes a UMTS/CDMA2000, a GPRS/CDMA, a GSM, the priority order is that the UMTS/CDMA2000 is prior to the GPRS/CDMA, and the GPRS/CDMA is prior to the GSM.

10. The apparatus as claimed in claim 9, wherein the switch module comprises:

a first switch sub-module for switching to the candidate network connection directly, when only one candidate network connection exists; and a second switch sub-module for switching the current network connection to a candidate network connection having the highest priority, when a plurality of candidate network connections exist.

11. The apparatus as claimed in claim 9, further comprising: a detection module for automatically performing a plurality of network connection availability detections regularly, and setting the network connection passing the availability detection as the network connection which is available for the mobile terminal.

12. The apparatus as claimed in claim 9, wherein the detection module is used for performing a connection operation on a list of specified network sites and detecting returning result, in a case where the network connection operates normally.

13. A mobile terminal, comprising:

a setting module for utilizing one of a plurality of network connections which are available for the mobile terminal as a current network connection, and setting remaining network connections among the plurality of network connections as candidate network connections;

a switch module for switching the mobile terminal to one of the candidate network connections in a priority order among the candidate network connections, when it is detected that a preset switch event occurs currently; and a network connection module for connecting the mobile terminal to a corresponding network through the current network connection when it is not detected that the preset switch event occurs currently, and for connecting the mobile terminal to a corresponding network connection through the one of the candidate network connections switched by the switch module thereto;

wherein, when the plurality of network connections comprises a wire connection and a wireless Local Area Network (WLAN) connection, the priority order is that the wire connection is prior to the WLAN connection;

when the plurality of network connections comprises the wire connection and a Wide Area Network (WAN) connection, the priority order is that the wire connection is prior to the WAN connection;

when the plurality of network connections comprises the WLAN connection and the WAN connection, the priority order is that the WLAN connection is prior to the WAN connection; and when the plurality of network connections comprises the WAN connection and the WAN connection includes a UMTS/CDMA2000, a GPRS/CDMA, a GSM, the priority order is that the UMTS/CDMA2000 is prior to the GPRS/CDMA, and the GPRS/CDMA is prior to the GSM.

\* \* \* \* \*